(12) United States Patent
Jang

(10) Patent No.: US 9,279,934 B2
(45) Date of Patent: Mar. 8, 2016

(54) BACKLIGHT UNIT AND DISPLAY DEVICE HAVING THE SAME

(71) Applicant: Samsung Display Co., Ltd., Yongin (KR)

(72) Inventor: Jae-Woo Jang, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/460,736

(22) Filed: Aug. 15, 2014

(65) Prior Publication Data

US 2015/0219838 A1 Aug. 6, 2015

(30) Foreign Application Priority Data

Feb. 3, 2014 (KR) ........................ 10-2014-0012177

(51) Int. Cl.
*F21V 8/00* (2006.01)

(52) U.S. Cl.
CPC ............ *G02B 6/0088* (2013.01); *G02B 6/0055* (2013.01); *G02B 6/0073* (2013.01)

(58) Field of Classification Search
CPC .. G02B 6/0088; G02B 6/0073; G02B 6/0055; G02F 1/1336
See application file for complete search history.

(56) References Cited

U.S. PATENT DOCUMENTS

| 8,310,617 | B2 | 11/2012 | Shimizu |
| 2012/0092890 | A1 | 4/2012 | Matsui |
| 2013/0135559 | A1 | 5/2013 | Deng et al. |
| 2013/0141651 | A1 | 6/2013 | Kuromizu |
| 2013/0242224 | A1 | 9/2013 | Yu |

FOREIGN PATENT DOCUMENTS

| JP | 2001-117084 | 4/2001 |
| KR | 10-2005-0015368 | 2/2005 |
| KR | 10-1191748 | 10/2012 |
| KR | 10-2012-0123921 | 11/2012 |
| KR | 10-1203520 | 11/2012 |
| KR | 10-2013-0020066 | 2/2013 |

*Primary Examiner* — Anne Hines
(74) *Attorney, Agent, or Firm* — H.C. Park & Associates, PLC

(57) ABSTRACT

A backlight unit includes a light source unit supplying light, a light guide plate guiding and emitting the light provided from the light source unit to emit the guided light, a reflective sheet disposed below the light guide plate, a lower cover accommodating the light source unit, the light guide plate, and the reflective sheet, and a fixing unit fixing the light guide plate, the reflective sheet, and the lower cover. The fixing unit includes a fixing screw fixing the light guide plate, the reflective sheet, and the lower cover, and a fixing screw holder surrounding at least one portion of the fixing screw to absorb an impact due to movement of the fixing screw.

19 Claims, 5 Drawing Sheets

BACKLIGHT UNIT AND DISPLAY DEVICE HAVING THE SAME

CROSS REFERENCE TO RELATED APPLICATIONS

This U.S. non-provisional patent application claims priority from and the benefit of Korean Patent Application No. 10-2014-0012177, filed on Feb. 3, 2014, the entire contents of which are hereby incorporated by reference as if fully set forth herein.

BACKGROUND

1. Field

Exemplary embodiments of the present disclosure relate to a backlight unit and a display device having the same, more particularly, to a backlight unit which is capable of reducing damage and a display device having the same.

2. Background

Since display devices including display panels such as liquid crystal panels or electrophoretic display panels are not capable of self-emitting light, the display devices need separate light sources for supplying light. For example, a display device may have a backlight unit.

Such a backlight unit typically has a light source that emits light and a light guide plate guiding the light emitted from the light source toward the display panel.

The light guide plate may expand from heat generated from the light source and thus, may be deformed. When the light guide plate expands, the light source may be pressed and damaged. Also, the light guide plate may be deformed or damaged by a fixing member fixing the light guide plate.

When an external impact or oscillation is applied to the light guide plate, the light guide plate may be deformed or damaged by the fixing member for fixing the light guide plate and the movement of the light guide plate.

As the light guide plate moves, optical sheets such as a diffusion sheet, a prism sheet, and a protection sheet and a reflective sheet may also be damaged.

SUMMARY

Exemplary embodiments of the present disclosure provide a backlight unit that is capable of reducing damage to a display device. The present disclosure also provides a display device that is capable of reducing damage of a backlight unit.

Additional features of the invention will be set forth in the description which follows, and in part will be apparent from the description, or may be learned by practice of the invention.

Exemplary embodiments of the inventive concept provide backlight units including: a light source unit supplying light; a light guide plate guiding and emitting the light provided from the light source unit to emit the guided light; a reflective sheet disposed below the light guide plate; a lower cover accommodating the light source unit, the light guide plate, and the reflective sheet; and a fixing unit fixing the light guide plate, the reflective sheet, and the lower cover; wherein the fixing unit includes: a fixing screw fixing the light guide plate, the reflective sheet, and the lower cover; and a fixing screw holder surrounding at least one portion of the fixing screw to absorb an impact due to movement of the fixing screw.

Other exemplary embodiments of the inventive concept provide display devices including: a display panel including a display area on which an image is displayed and a non-display area on which an image is not displayed; and a backlight unit providing light to the display panel, wherein the backlight unit includes: a light guide plate guiding and emitting light provided from the light source unit; a light source unit supplying the light to the light guide plate; a reflective sheet disposed below the light guide plate; a lower cover accommodating the light source unit, the light guide plate, and the reflective sheet; and a fixing unit fixing the light guide plate, the reflective sheet, and the lower cover; wherein the fixing unit includes: a fixing screw fixing the light guide plate, the reflective sheet, and the lower cover; and a fixing screw holder surrounding at least one portion of the fixing screw to absorb an impact due to movement of the fixing screw.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
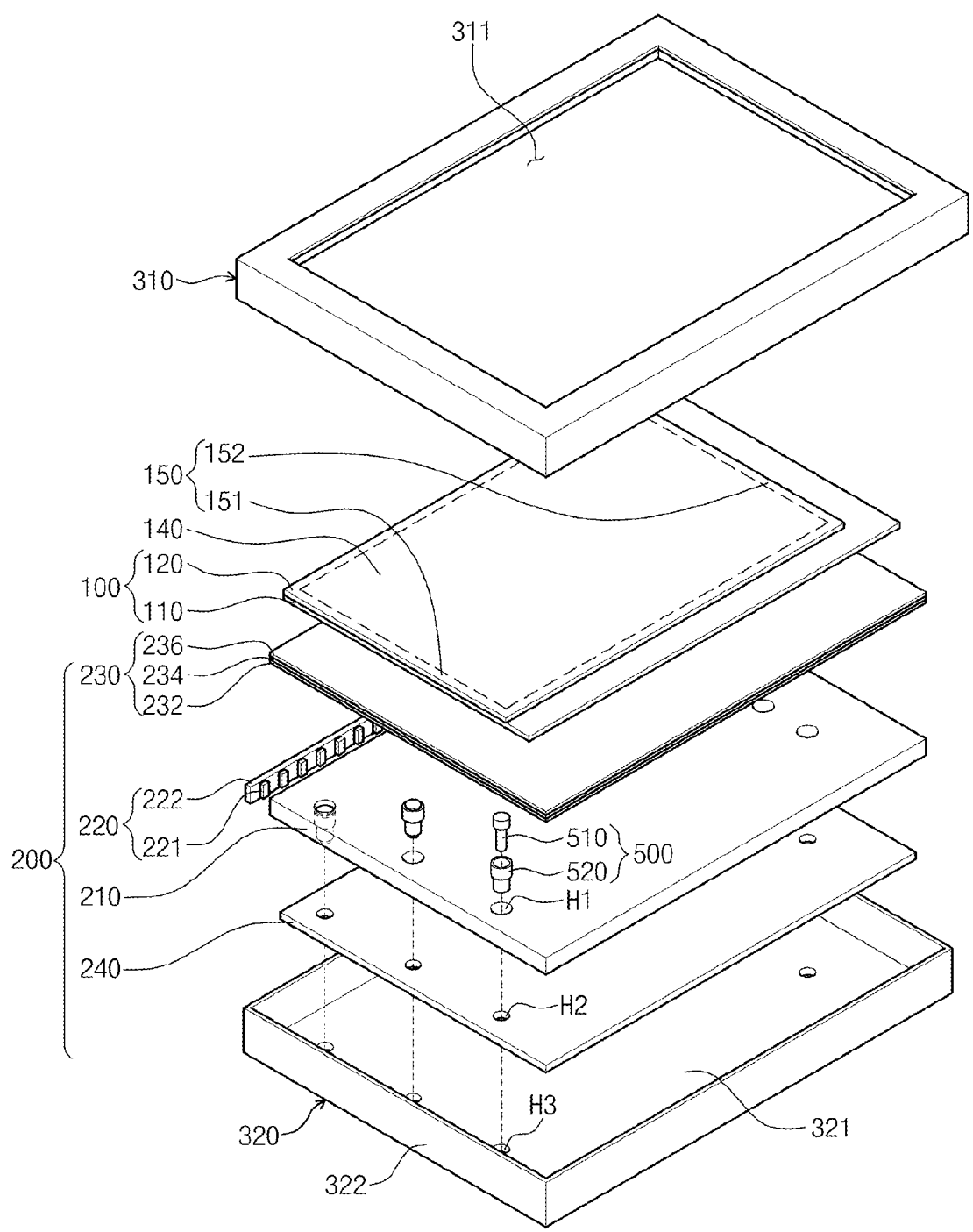
FIG. 1 is an exploded perspective view of a display device according to an exemplary embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is an exploded perspective view of a display device according to an embodiment of the inventive concept.

Referring to FIG. 1, the display device according to an exemplary embodiment of the inventive concept includes a display panel 100 and a backlight unit 200. The display panel 100 includes a display area 140 on which an image is displayed and a non-display area 150 on which an image is not displayed. A non-emitting type display panel that requires a separate backlight unit may be adapted as the display panel 100 instead of a self light-emitting type display panel such as an organic light-emitting display (OLED) panel. For example, various display panels such as a liquid crystal display panel (LCD), an electrophoretic display panel (EDP), or the like may be used. In the current exemplary embodiment, the display panel 100 described will be a LCD display.

The present disclosure is not limited to the shape of the display panel 100 shown in the drawings. For example, the display panel may have a square shape. The display panel 100 includes a lower substrate 110, an upper substrate 120 facing the lower substrate 110, and a liquid crystal layer (not shown) disposed between the lower and upper substrates 110 and 120.

A plurality of gate lines (not shown) extending in a first direction and a plurality of data lines (not shown), which extend in a second direction crossing the first direction and are insulated from the plurality of gate lines, may be disposed on the lower substrate 110. A plurality of pixels (not shown) may be arranged in a matrix form on the lower substrate 110. A thin film transistor (TFT) (not shown) and a pixel electrode (not shown) may be disposed on each of the pixels. A gate electrode (not shown) of the TFT may be electrically connected to a corresponding gate line of the gate lines, and a source electrode (not shown) of the TFT is electrically connected to a corresponding date line of the data lines. Additionally, a drain electrode (not shown) of the TFT may be electrically connected to the pixel electrode. Thus, the TFT may switch a signal for controlling or driving each pixel to the pixel electrode.

The upper substrate 120 may include a color filter (not shown) for realizing a predetermined color by using light and a common electrode (not shown) disposed on the color filter to face the pixel electrode. The color filter and the common electrode may be disposed on the lower substrate 110.

The liquid crystal layer may be arranged in a certain direction by a voltage applied to the pixel electrode and the common electrode, which adjusts transmittance of the light provided from the backlight unit 200 so that the display panel 100 displays an image.

Figure 2:
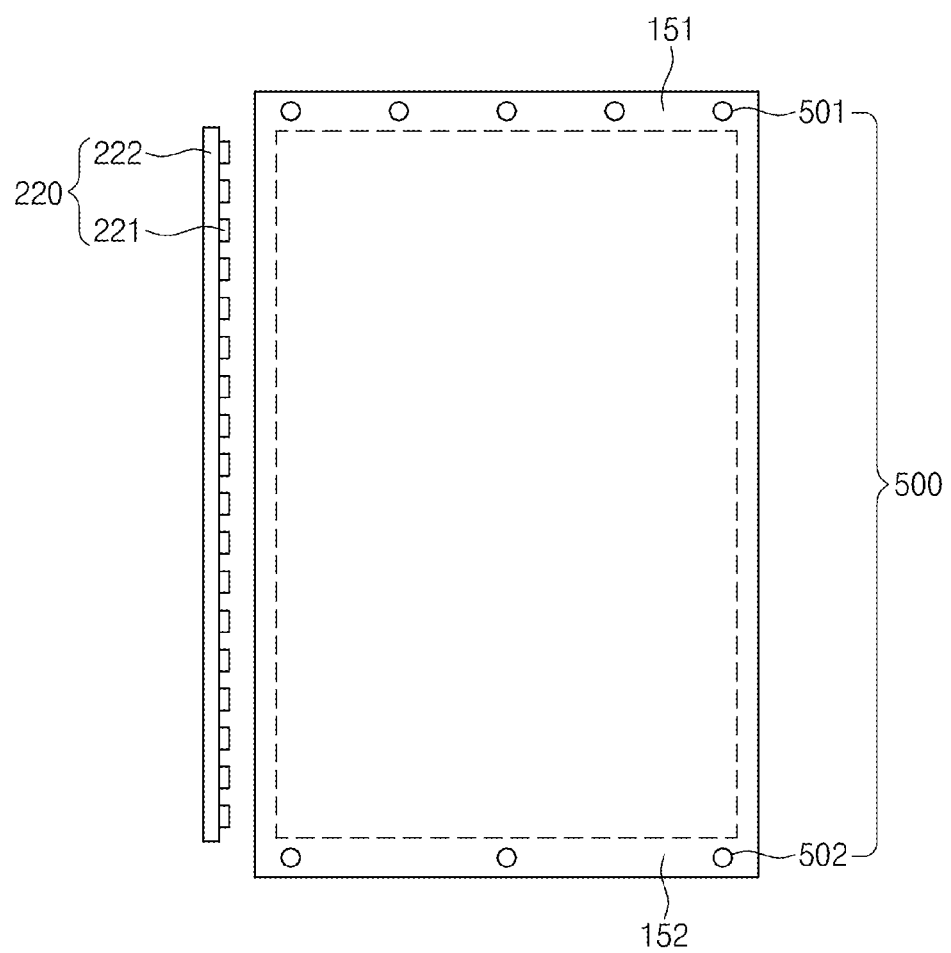
FIG. 2 is a schematic plan view of a backlight unit according to an exemplary embodiment of the inventive concept.
Figure 3:
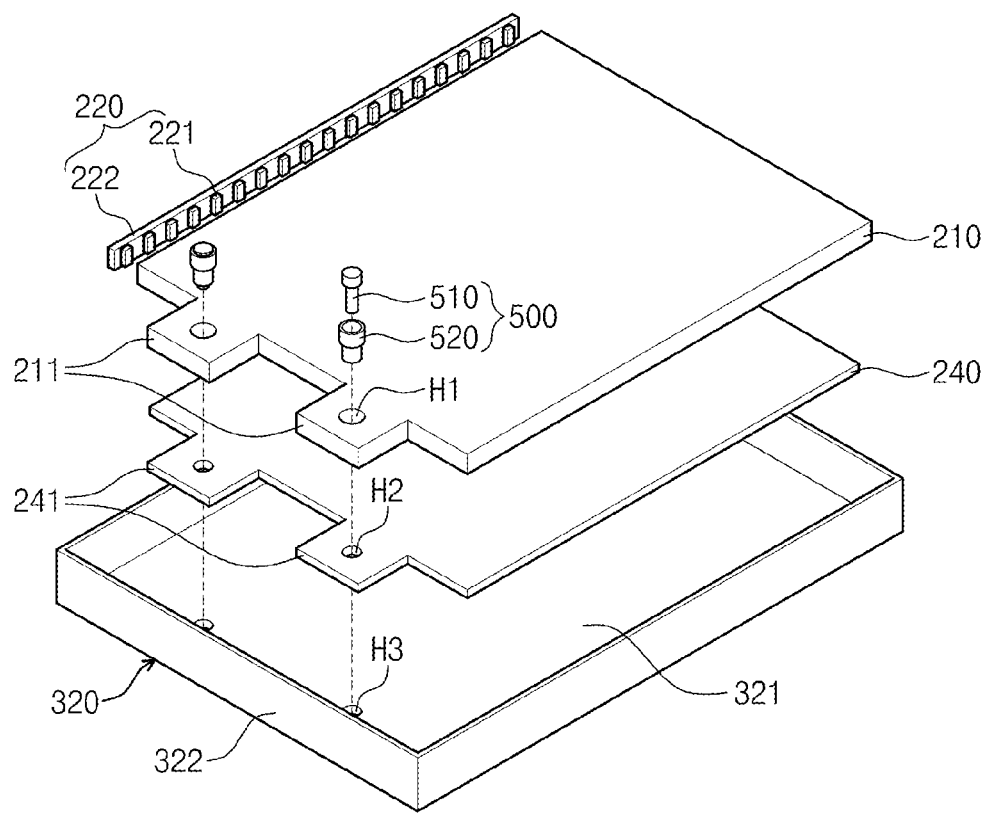
FIG. 3 is a schematic perspective view of the backlight unit according to an exemplary embodiment of the inventive concept.

FIG. 2 is a schematic plan view of a backlight unit according to an embodiment of the inventive concept and FIG. 3 is a schematic perspective view of the backlight unit according to an embodiment of the inventive concept.

Referring to FIGS. 1 to 3, the backlight unit 200 includes a light source unit 220, a light guide plate 210, a reflective sheet 240, a lower cover 320, and a fixing unit 500.

The light source unit 220 supplies the light to the light guide plate 210. The light source unit 220 may include at least one light source 221 and a circuit substrate 222 having one surface on which the light source 221 is mounted. The circuit substrate 222 applies power to the light source 221.

A light emitting diode (LED) may be used as the light source 221, but is not limited thereto. A heat dissipation member for dissipating heat generated in the light source 221 may be disposed on a surface opposite to that on which light source 221 of the circuit board is mounted. The light source unit 220 is disposed to face one side surface of the light guide plate 210 to supply the light to the light guide plate 210.

The light guide plate 210 may guide and emit the light provided from the light source unit 220. The light guide plate 210 may have a rectangular plate shape and be formed of a transparent material capable of refracting light. The light guide plate 210 may be formed of a transparent polymer resin such as polycarbonate, polymethyl methacrylate, or the like.

The backlight unit 200 includes a reflective sheet 240. The reflective sheet 240 is disposed below the light guide plate 210. The reflective sheet 240 may reflect leaking light by changing a path of the light. The reflective sheet 240 may be formed of a material which is capable of reflecting light.

The lower cover 320 accommodates the light source unit 220, the light guide plate 210, and the reflective sheet 240. The lower cover 320 may include a bottom surface 321 corresponding to shapes of the display panel 100 and the light guide plate 210, and a plurality of lower cover side surfaces 322 extending from the bottom surface 321 and bent upward. The lower cover 320 has a space defined by the bottom surface 321 and the lower cover side surface 322, which is capable of accommodating the light source unit 220, the light guide plate 210, and the reflective sheet 240. The lower cover 320 may be coupled to an upper cover 310 to accommodate and support the display panel 100, the light source unit 220, the light guide plate 210, and the reflective sheet 240 contained therein.

Referring to FIG. 1, the light guide plate has a light guide plate fixing hole H1 into which a fixing screw 510 is inserted. The reflective sheet 240 has a reflective sheet fixing hole H2 into which the fixing screw 510 is inserted, and the lower cover 320 has a lower cover fixing hole H3 into which the fixing screw 510 is inserted.

Each of the light guide plate fixing hole H1, the reflective sheet fixing hole H2, and the lower cover fixing hole H3 is capable of being coupled to the fixing screw 510. However, the present disclosure is not limited to the illustrated shape thereof. That is, each of the light guide plate fixing hole H1, the reflective sheet fixing hole H2, and the lower cover fixing hole H3 may have various shapes such as a circular shape, an oval shape, a triangular shape, a square shape, a polygonal shape, and the like.

The light guide plate fixing hole H1, the reflective sheet fixing hole H2, and the lower cover fixing hole H3 may have sizes equal to or different from each other.

Referring to FIG. 3, the backlight unit 200 may include a light guide plate protrusion 211 disposed on at least one side surface of the light guide plate 210 and a reflective sheet protrusion 241 disposed on at least one side surface of the reflective sheet 240. The light guide plate fixing hole H1 may be defined in the light guide plate protrusion 211, and the reflective sheet fixing hole H2 may be defined in the reflective sheet protrusion 241.

Referring back to FIG. 1, an optical member 230 may be disposed between the light guide plate 210 and the display panel 100. The optical member 230 controls the light which is provided from the light source unit 220 and emitted through the light guide plate 210. The optical member 230 may include a first optical sheet 232, a second optical sheet 234, and a third optical sheet 236, which are successively laminated.

The first optical sheet 232 may be a diffusion sheet that diffuses the light emitted from the light guide plate 210. The second optical sheet 234 may be a prism sheet which collects the light diffused by the diffusion sheet in a direction that is perpendicular to a plane of the display panel 100 that is disposed thereabove. The third optical sheet 236 may be a protection sheet which protects the prism sheet from an external impact. At least one of the first, second, and third optical sheets 232, 234, and 236 may be provided in plurality to overlap each other. Further, one of the first, second, and third optical sheets 232, 234, and 236 may be omitted as necessary.

Referring to FIGS. 1 to 3, the backlight unit 200 includes the fixing unit 500 for fixing the light guide plate 210, the reflective sheet 240, and the lower cover 320. The fixing unit 500 may be provided in plurality.

The plurality of fixing units 500 may overlap each other on the non-display area 150, when viewed from the side. That is, the fixing units 500 may be aligned with each other along at least one of the sides of the non-display area 150.

Referring to FIG. 2, the non-display area 150 may include a first non-display area 151 and a second non-display area 152. The first and second non-display areas 151 and 152 are spaced apart from each other. The first and second non-display areas 151 and 152 may have sizes and shapes equal to or different from each other. The first and second non-display areas 151 and 152 are not adjacent to the light source unit 220.

The plurality of fixing units 500 may overlap each other on the first and second non-display areas 151 and 152 when viewed from the side. That is, the fixing units 500 may be aligned with each other along at least one of the sides of the non-display area 150.

Although fixing units 501 are spaced at a predetermined distance from each other in FIG. 2, the present disclosure is not limited thereto. For example, the fixing units 501 may be spaced apart from each other at different distances. Also, although fixing units 502 are spaced at a predetermined distance from each other in FIG. 2, the present disclosure is not limited thereto. For example, the fixing units 502 may be spaced apart from each other at different distances. Further, the fixing units 501 can be spaced apart at a same distance as the fixing units 502 or the fixing units 501 can be spaced apart at a distance different from the distances by which the fixing units 502 are spaced apart.

A distance between the fixing units 501 may be equal to or different from that between the fixing units 502.

Figure 4A:
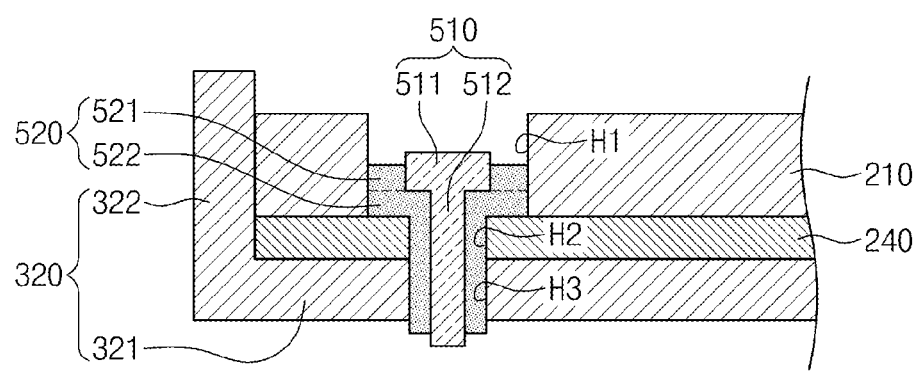
FIGS. 4A, 4B, and 4C are cross-sectional views illustrating various configurations of the backlight unit according to an exemplary embodiment of the inventive concept.
Figure 4B:
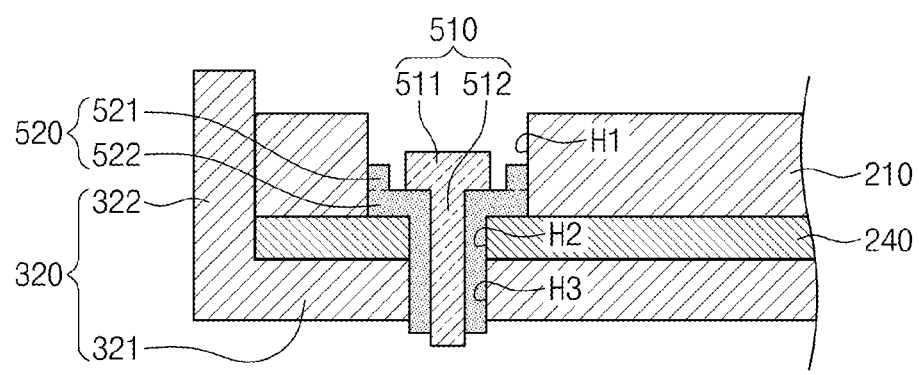
Figure 4C:
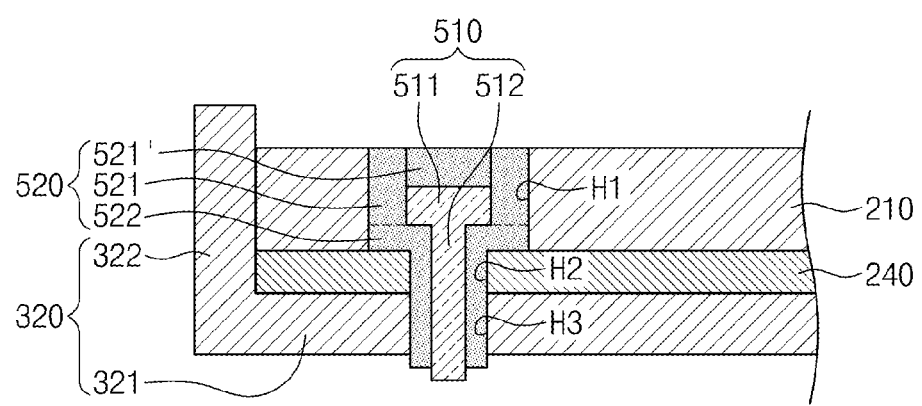

FIGS. 4A to 4C are cross-sectional views illustrating various configurations of the backlight unit according to an embodiment of the inventive concept.

The backlight unit 200 includes the fixing unit 500, and the fixing unit 500 includes the fixing screw 510 and a fixing screw holder 520. The fixing screw 510 fixes the light guide plate 210, the reflective sheet 240, and the lower cover 320 to one another.

Although the fixing screw 510 may pass through the light guide plate fixing hole H1, the reflective sheet fixing hole H2, and the lower cover fixing hole H3, the present disclosure is not limited thereto. For example, when the fixing screw 510 may fix the light guide plate 210, the reflective sheet 240, and the lower cover 320, the fixing screw 510 may pass through the light guide plate fixing hole H1, the reflective sheet fixing hole H2, and a portion of the lower cover fixing hole H3.

If the fixing screw 510 fixes the light guide plate 210, the reflective sheet 240, and the lower cover 320, embodiments of the present disclosure are not limited to the shape of the fixing screw 510 shown in the drawings. For example, the fixing screw 510 may have various shapes such as a cylindrical shape, a square pillar shape, and the like.

Referring to FIGS. 4A to 4C, the fixing screw 510 may include a body 512 and a head 511 connected to an upper portion of the body 512.

The head 511 may be inserted into the light guide plate 210. The head 511 may be disposed in at least one portion of the light guide plate fixing hole H1. The head 511 may be disposed in at least one portion of the reflective sheet fixing hole H2 and the lower cover fixing hole H3. Embodiments of the present disclosure are not limited to a shape of a plane of the head 511. For example, the plane of the head 511 may have various shapes such as a circular shape, an oval shape, a triangular shape, a square shape, and the like.

The body 512 may be disposed in the reflective sheet fixing hole H2 and at least one portion of the lower cover fixing hole H3, and may be disposed in at least one portion of the light guide plate fixing hole H1.

The present disclosure is not limited to the shape of the body 512. For example, the body 512 may have various shapes such as a cylindrical shape, a rectangular shape, and the like.

The fixing unit 500 includes the fixing screw holder 520. The fixing screw holder 520 may surround at least one portion of the fixing screw 510 to absorb an impact due to movement of the fixing screw 510. The fixing screw holder 520 may be formed of an elastic material such as silicon. Thus, the backlight unit 200 may be prevented from being deformed or damaged.

The fixing screw holder 520 may have a thickness of about 0.5 mm to about 5 mm. When the fixing screw holder 520 has a thickness less than about 0.5 mm, the fixing screw holder 520 may not sufficiently absorb the impact due to the movement of the light guide plate 210 and the fixing screw 510. When the fixing screw holder 520 has a thickness greater than about 5 mm, the fixing screw holder 520 is not suitable to be used in the backlight unit 200.

At least one portion of the fixing screw holder 520 may be disposed between an inner surface of the light guide plate fixing hole H1 and the fixing screw 510. Thus, the fixing screw holder 520 may absorb the impact due to the movement of the light guide plate 210 that is caused by an external impact and oscillation to prevent the backlight unit 200 from being deformed or damaged.

The fixing screw holder 520 may include a body holder 522 preventing the body 512 from moving and a head holder 521 preventing the head 511 from moving. The body holder 522 may surround the body 512, and the head holder 521 may be disposed between the head 511 and the inner surface of the light guide plate fixing hole H1.

Embodiments of present disclosure are not limited to the position of the fixing screw holder 520 illustrated in the drawings. For example, the fixing screw holder 520 may be disposed at a position in which the impact due to the movement of the fixing screw 510 is absorbed. That is, as illustrated in FIG. 4A, the head holder 521 may be closely attached to the head 511, and as illustrated in FIG. 4B, the head holder 521 may be spaced from the head 511. As illustrated in FIG. 4C, the fixing screw holder 520 may include a head top cover holder 521' for covering an upper portion of the head 511.

Referring to FIG. 1, the display device may further include an upper cover 310 disposed on the display panel 100. The upper cover 310 may have a shape corresponding to that of the display panel 100. The upper cover 310 includes an opening 311 exposing the display area 140 of the display panel 100, an upper surface supporting an edge of a front surface of the display panel 100, and a plurality of upper cover 310 side surfaces bent toward the lower cover 320. The upper cover 310 is coupled to the lower cover 320 to support the edge of the front surface of the display panel 100.

The backlight unit 200 and the display device according to an embodiment of the inventive concept may include the fixing screw holder 520 to prevent the backlight unit 200 from being deformed or damaged by the movement of the fixing screw 510 when the light guide plate 210 expands due to the heat generated in the light source 221. When the external impact or oscillation is applied to the light guide plate 210, the fixing screw holder 520 may absorb the impact, and thus the backlight unit 200 may be prevented from being deformed and damaged due to the movements of the fixing screw 510 for fixing the light guide plate 210 and the light guide plate 210.

The backlight unit according to exemplary embodiments of the inventive concept may be reduced in damage. In the display device according to exemplary embodiments of the inventive concept, the damage of the backlight unit may be reduced.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A backlight unit comprising:
   a light source unit configured to supply light;
   a light guide plate configured to guide and emit the light supplied from the light source unit;
   a reflective sheet disposed under the light guide plate;
   a lower cover, the light source unit, the light guide plate, and the reflective sheet disposed on the lower cover; and
   a fixing unit fixing the light guide plate, the reflective sheet, and the lower cover;
   wherein the fixing unit comprises:
   a fixing screw fixing the light guide plate, the reflective sheet, and the lower cover to one another, and
   a fixing screw holder surrounding at least a portion of the fixing screw and configured to absorb an impact from movement of the fixing screw,
   wherein the fixing screw comprises a body and a head connected to an upper portion of the body, and the head is inserted into the light guide plate.

2. The backlight unit of claim 1, wherein the fixing unit is provided in plurality.

3. The backlight unit of claim 1, wherein the light guide plate comprises a light guide plate fixing hole into which the fixing screw is inserted,
   the reflective sheet comprises a reflective sheet fixing hole into which the fixing screw is inserted, and
   the lower cover has a lower cover fixing hole into which the fixing screw is inserted.

4. The backlight unit of claim 3, wherein the backlight unit comprises a light guide plate protrusion disposed on at least one side surface of the light guide plate and a reflective sheet protrusion disposed on at least one side surface of the reflective sheet.

5. The backlight unit of claim 4, wherein the light guide plate fixing hole is disposed in a light guide plate protrusion, and the reflective sheet fixing hole is disposed in the reflective sheet protrusion.

6. The backlight unit of claim 1, wherein a portion of the fixing screw
   holder is disposed between an inner surface of the light guide plate fixing hole and the fixing screw.

7. The backlight unit of claim 1, wherein the fixing screw holder comprises a body holder configured to prevent the body from moving and a head holder configured to prevent the head from moving, wherein the body holder surrounds the body, and the head holder is disposed between the head and the inner surface of the light guide plate fixing hole.

8. The backlight unit of claim 7, wherein the head holder is spaced apart from the head.

9. The backlight unit of claim 7, wherein the fixing screw holder comprises a head top cover holder covering an upper portion of the head.

10. The backlight unit of claim 1, wherein the fixing screw holder is formed of an elastic material.

11. The backlight unit of claim 1, wherein the fixing screw holder has a thickness of 0.5 mm to 5 mm.

12. A display device comprising:
    a display panel comprising a display area in which an image is displayed and a non-display area in which an image is not displayed; and
    a backlight unit configured to provide light to the display panel,
    wherein the backlight unit comprises:
    a light source unit configured to supply light;
    a light guide plate configured to guide and emit the light supplied from the light source unit;
    a reflective sheet disposed under the light guide plate;
    a lower cover, the light source unit, the light guide plate, and the reflective sheet disposed on the lower cover; and
    a fixing unit fixing the light guide plate, the reflective sheet, and the lower cover;
    wherein the fixing unit comprises:
    a fixing screw fixing the light guide plate, the reflective sheet, and the lower cover; and
    a fixing screw holder surrounding a portion of the fixing screw and configured to absorb an impact from movement of the fixing screw,
    wherein the fixing screw comprises a body and a head connected to an upper portion of the body, and the head is inserted into the light guide plate.

13. The display device of claim 12, wherein the fixing unit is provided in plurality.

14. The display device of claim 12, wherein the fixing unit is provided in plurality and aligned along a first direction on the non-display area.

15. The display device of claim 12, wherein the non-display area comprises a first non-display area and a second non-display area which are spaced apart from each other, and the fixing unit is provided in plurality and aligned along a first direction on the first and second non display areas.

16. The display device of claim 15, wherein a distance between the fixing units
    aligned on the first non-display area is different from that between the fixing units aligned on the second non-display area.

17. The display device of claim 12, wherein the fixing screw holder comprises an elastic material.

18. The display device of claim 12, wherein the fixing screw holder has a thickness of 0.5 mm to 5 mm.

19. The display device of claim 12, further comprising an upper cover disposed on the display panel.

* * * * *